United States Patent
Bolda et al.

(10) Patent No.: US 6,204,751 B1
(45) Date of Patent: Mar. 20, 2001

(54) CURRENT INRUSH LIMITING CIRCUIT WITH FAST RESET

(75) Inventors: Daniel J. Bolda, New Berlin; Steven T. Haensgen, Oak Creek, both of WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/408,133

(22) Filed: Sep. 29, 1999

(51) Int. Cl.[7] .................................................. G08B 9/00
(52) U.S. Cl. ...................... 340/286.02; 340/664; 361/86; 361/87
(58) Field of Search ................... 340/286.02, 657, 340/659, 660, 664; 361/5, 18, 78, 86, 87

(56) References Cited

U.S. PATENT DOCUMENTS

| | | | |
|---|---|---|---|
| 4,156,172 | * 5/1979 | Hucker et al. | 322/68 |
| 5,153,457 | * 10/1992 | Martin et al. | 326/84 |
| 5,212,619 | * 5/1993 | Baudelot et al. | 361/91 |
| 5,726,592 | * 3/1998 | Schulte et al. | 327/65 |
| 6,095,867 | * 8/2000 | Brandt et al. | 439/620 |

* cited by examiner

Primary Examiner—Edward Lefkowitz
(74) Attorney, Agent, or Firm—Diana M. Sangalli; John J. Horn; William R. Walbrun

(57) ABSTRACT

A circuit for and method of controlling transient currents on power conductors includes a voltage-controlled switch connected between one of the power conductors and a load. A turn-on circuit is connected to the switch to control the switch during a transition period in which the switch changes from a non-current conducting state to a conducting state in which a static current flow to the load can be maintained. The turn-on circuit controls turn-on such that the rate of rise and the peak amplitude of the current through the switch is limited during the transition period. A reset circuit also is connected to the voltage-controlled switch to reset the switch to a non-conductive state when the voltage between the power conductors drops out. The reset circuit is configured to reset the switch within a reset period having a duration that is shorter than the duration of the transition period. The circuit and method are particularly suited for use in a network in which the power conductors provide electrical power to a plurality of nodes, and are even more suited for use in a network in which the power conductors and the data conductors, which transmit data between nodes, are disposed within a single media cable.

26 Claims, 6 Drawing Sheets

CURRENT INRUSH LIMITING CIRCUIT WITH FAST RESET

BACKGROUND OF THE INVENTION

1. Field of the Invention

The present invention relates generally to a circuit and method of controlling transient currents resulting from connecting a load to power conductors. More particularly, the present invention relates to a networked system in which the power conductors provide electrical power to a plurality of nodes. The inventive circuit and method control the turn-on and reset of a voltage-controlled switch which connects a load at one of the nodes to the power conductors, thereby limiting transient currents on the power conductors.

2. Description of the Related Art

Networked control systems typically include a number of device nodes coupled to a set of common conductors for transmitting power and data. The node devices often include both sensors and actuators of various types, as well as microprocessor-based controllers or other command circuitry. Moreover, some sensor and actuator nodes may also include signal processing capabilities, memory devices, and so forth. Power supplies coupled to the network furnish electrical energy via the network media to operate the sensors, actuators and other devices requiring an external power source. In operation, networked sensors provide information via the physical communications media relating to the states of various operating parameters. Other devices on the network process the transmitted parameter data and command operation of networked actuators, such as relays, valves, electric motors, and so forth. One device network of this type is commercially available from the Allen-Bradley Company of Milwaukee, Wis. under the commercial designation, DeviceNet.

Unlike unpowered data networks, powered industrial control networks pose unique problems for the transmission of both electrical power and data to and from networked devices. For example, the provision of power conductors and data conductors in a single cable can result in unwanted noise and other interference between the conductors, ultimately leading to bit errors in the transmission of the digitized data. A source of such interference or noise is transient current on the power conductors that is generated, for example, by connecting or disconnecting networked devices, energizing or deenergizing networked actuators, etc. Such noise sources must be controlled to reduce the likelihood that the generated noise may corrupt data transmitted to networked devices and, ultimately, the overall reliability of the network.

In addition to data corruption, noise sources may produce other undesirable effects. For example, due to the inherent impedance and reactance of the power conductors, power conductor current transients can result in power conductor voltage transients, which, in turn, can interrupt operation of networked devices or even potentially damage networked devices. Accordingly, control of such current transients is further desirable to ensure continued and reliable operation of networked devices.

There is a need, therefore, for a device and method to control current transients that may result in detrimental voltage transients on the power conductors. Such a device and method would be particularly desirable to prevent interruptions in the operation and damage to networked devices which all receive power via the power conductors. Further, in networked systems in which the power conductors and data conductors are provided in a single network media cable, it would be desirable to control such current transients to reduce the risk of bit errors that may be introduced on the data conductors as a result of transients on the power conductors.

SUMMARY OF THE INVENTION

The invention provides a current transient control circuit and a method for controlling current transients designed to respond to the aforementioned needs. The current transient control circuit and method may be used in a network including a plurality of nodes connected to a media cable. The media cable includes first and second power conductors for providing electrical power to each of the nodes, and first and second data conductors for transmitting data between the nodes. The media cable further includes an insulative cover which extends over both the power conductors and the data conductors. Although in a preferred application of the invention the transient control circuit is disposed at one of the network nodes, it should be understood that the transient control circuit may also be used in non-networked applications.

In accordance with one aspect of the invention, the current transient control circuit includes an input, an output, a voltage-controlled current source electrically connected between the input and the output, and a turn-on circuit and a reset circuit which both are electrically connected to the current source. The current source has a first state in which a current flow is substantially prevented and a second state in which a current flow is generated. The turn-on circuit is configured to apply a turn-on voltage to the current source to place the current source in the second state. The turn-on circuit is furthered configured to limit the rate of rise of the turn-on voltage and the peak amplitude of the current flow generated while the current source is in the second state. The reset circuit is configured to reset the current source to the first state, in which current flow is substantially prevented, at a reset rate that is faster than the rate of rise of the turn-on voltage.

In accordance with another aspect of the invention, a transient control circuit includes a solid-state switch coupled between a power conductor and a load, a turn-on circuit coupled to the switch to control current flow through the switch, and a reset circuit coupled to the switch to reset the switch to a non-conductive state in which current flow through the switch is substantially prevented. The switch also has a conductive state in which the current flow through the switch can be maintained at a static level. The turn-on circuit controls the current flow through the switch during a transition period during which the switch transitions from the non-conductive state to the conductive state. During the transition period, the turn-on circuit limits the rate of increase and the peak amplitude of the current flow through the switch.

In yet another aspect of the invention, a transient control circuit includes a voltage-controlled switch electrically connected between a power connector and a load, and a turn-on circuit coupled to the switch to control a transition mode of operation during which the switch transitions from a non-conductive state to a static mode of operation. During the transition mode of operation, the turn-on circuit limits the rate of increase and the peak amplitude of current flow through the voltage-controlled switch.

In accordance with yet another aspect of the invention, a method of controlling transients on the power conductors of a network media cable is provided. The method includes electrically coupling a voltage-controlled switch between a first power conductor and the load, applying a voltage to the voltage-controlled switch to cause the switch to transition from a non-conductive state to a static mode of operation during a transition period, and controlling the applied voltage to limit the rise time of current flow during the switch during at least a portion of the transition period. The method also includes limiting the peak amplitude of the current flow during the transition period and resetting the switch from the static mode of operation to the non-conductive state when the magnitude of the voltage between the power conductors falls below a threshold value.

BRIEF DESCRIPTION OF THE DRAWINGS

The foregoing and other advantages of the invention will become apparent upon reading the following detailed description and upon reference to the drawings in which like reference numerals denote like elements and.

DETAILED DESCRIPTION OF SPECIFIC EMBODIMENTS

The present invention will hereinafter be described in terms of its use in a system in which a plurality of devices are interconnected in a network. It should be understood, however, that a network is merely an exemplary environment for the invention and, thus, the invention should not be construed as limited to networked devices.

Figure 1A:
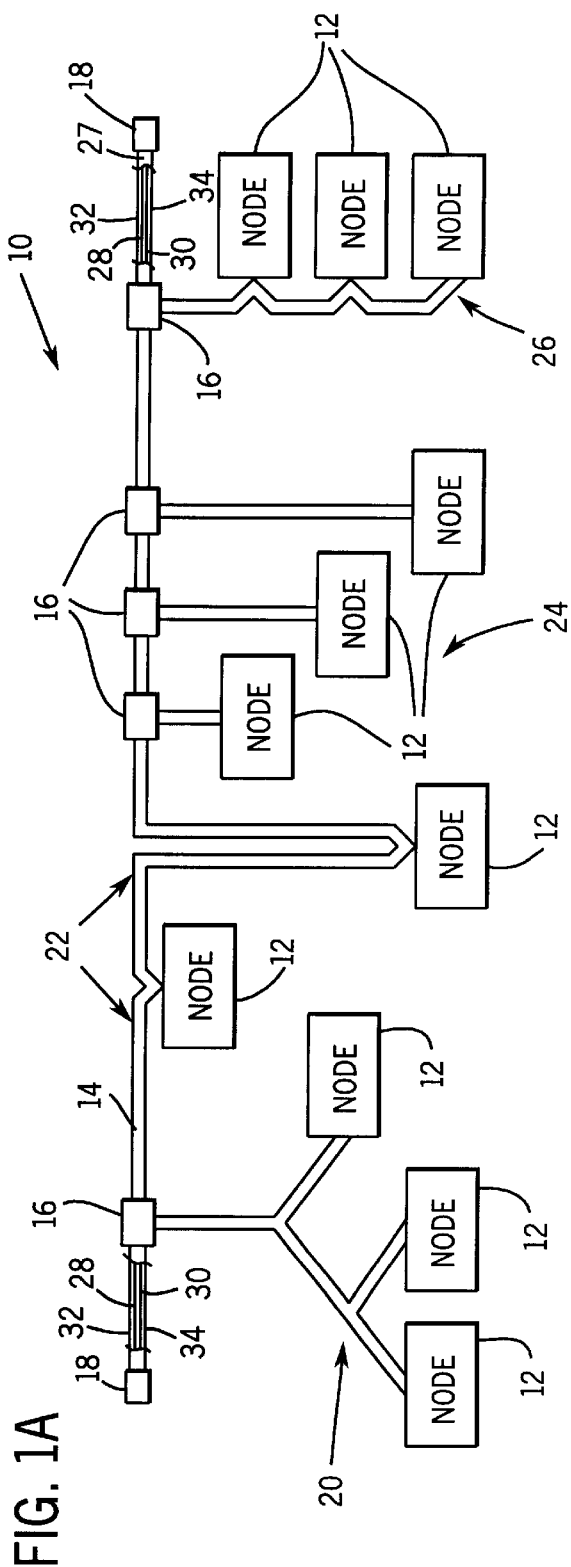
FIG. 1A is a diagrammatical illustration of a device network including a number of nodes coupled to a media cable via a series of modular connectors, the media cable including both power conductors and data conductors.

Turning now to the drawings, and referring first to FIG. 1A, an exemplary networked environment in which the invention can be used is illustrated. The networked environment is shown as a data and power network, designated generally by the reference numeral 10, in which a plurality of device nodes 12 are interconnected by a media cable 14. Each device node receives power and data signals from cable 14 via a modular connector 16. At ends of cable 14, terminators 18 are provided for capping the cable ends and electrically terminating the signal conductors of the cable.

Each device node 12 typically includes a networked sensor or actuator unit, as can be appreciated by those skilled in the art. Depending upon the particular application (e.g., an industrial control system) in which network 10 is installed, nodes 12 may include such devices as push-button switches, proximity sensors, flow sensors, speed sensors, actuating solenoids, electrical relays, and so forth. The nodes 12 can be coupled to the network cable 14 in a variety of topologies, including "branch drop" structures 20, "zero drop" connections 22, "short drop" connections 24, and "daisy chain" arrangements 26. In the preferred embodiment illustrated, cable 14 includes an insulative jacket 27 which covers a pair of signal (or data) conductors 28 and 30 and a pair of power conductors 32 and 34. A partially cut-away diagrammatic representation of cable 14 is shown in FIG. 1A proximate terminators 18 to provide a clearer understanding of the structure of cable 14.

As can be appreciated by those skilled in the art, each node 12 can transmit and receive data signals via data conductors 28 and 30 in accordance with various standard protocols. For example, conductors 28 and 30 can conduct pulsed data signals in which levels of electrical pulses are identified by the nodes as data representative of node addresses and parameter information. Each node device generally is programmed to recognize data signals transmitted over cable 14 that are required for executing a particular node function. Hardware and software of generally known types are provided at sensing nodes for encoding sensed parameters and for transmitting digitized data signals over cable 14 representative of a node address and of a value of the sensed parameters.

Figure 1B:
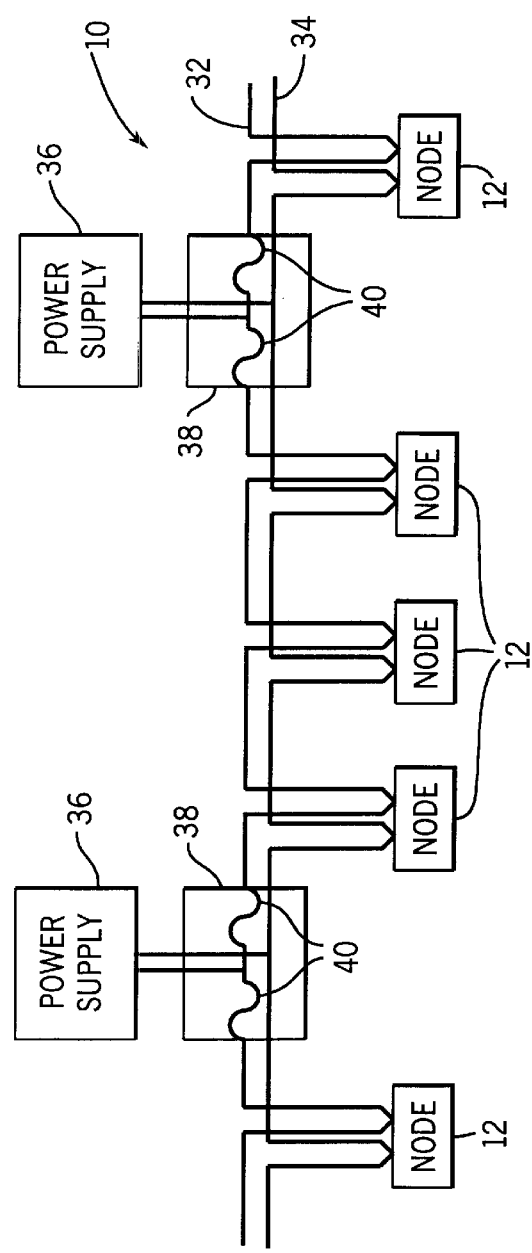
FIG. 1B is a diagrammatical illustration of a typical power distribution topology used in the network illustrated in FIG. 1A.

As represented in FIG. 1B, power conductors 32 and 34 of cable 14 permit nodes 12 to receive electrical power for their operation. In the preferred embodiment illustrated, conductors 32 and 34 form a direct current bus of predetermined voltage, such as 24 volts. Electrical power is applied to conductors 32 and 34 by power supply circuits 36 electrically coupled to conductors 32 and 34 at power taps 38. The configuration and circuitry for power supply circuits 36 are generally known in the art. Each power tap 38 may include protective devices such as fuses 40. One or both fuses may be removed from the power taps in order to isolate a portion of the network as desired.

Figure 1C:
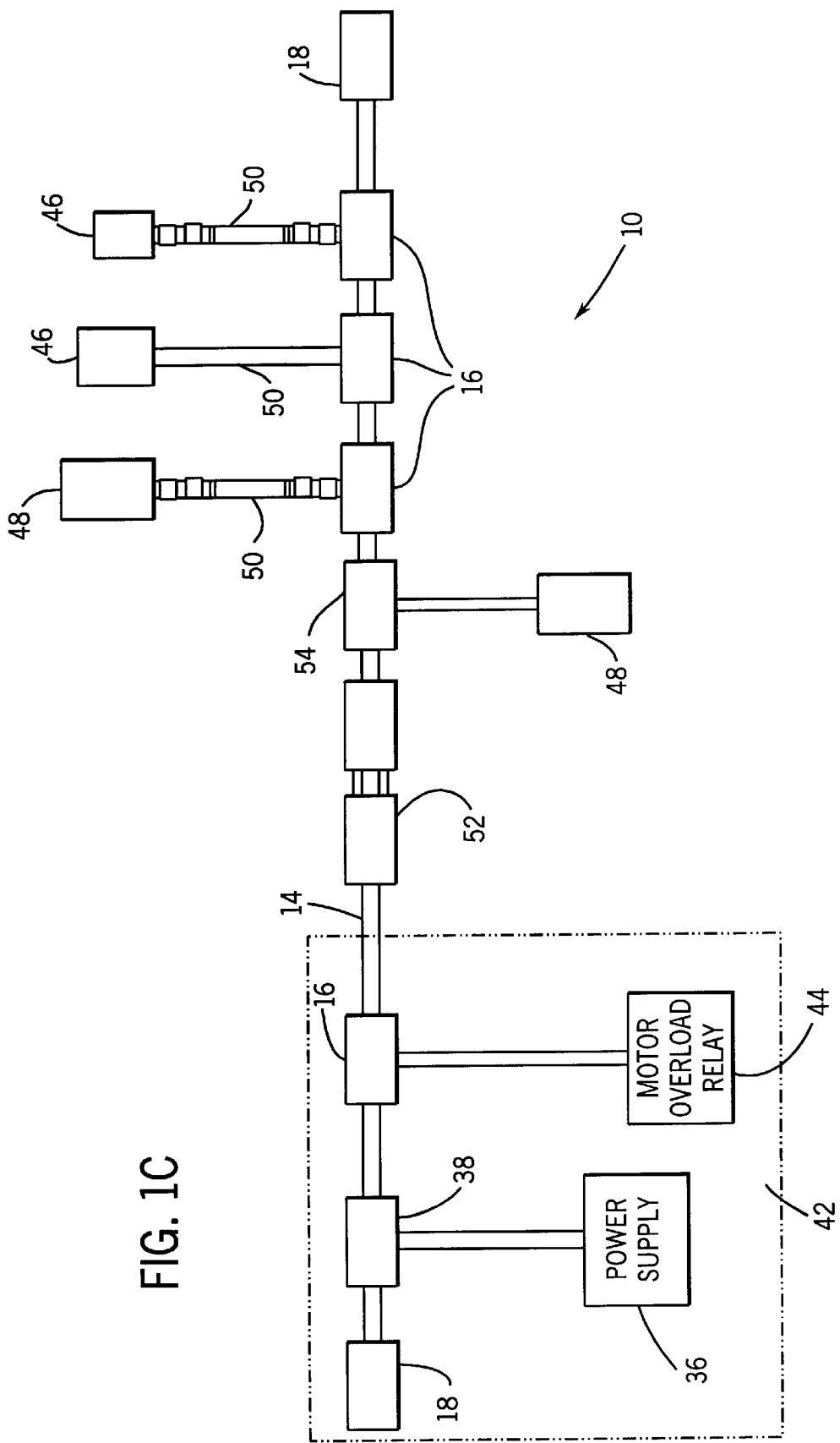
FIG. 1C is a diagrammatical illustration of physical devices positioned and coupled in the network of FIG. 1A, including an enclosure in which a device, such as a motor overload relay, is disposed.

FIG. 1C illustrates a typical physical level diagrammatical view of the network shown in FIGS. 1A and 1B. As illustrated in Figure IC, one or several of the foregoing components may be positioned in an enclosure 42. In a typical industrial application, enclosure 42 might be installed in a location in a factory readily accessible to operations and maintenance personnel, while other components of the network are positioned on manufacturing, processing, material handling and other equipment remote from the enclosure location. In the arrangement illustrated in FIG. 1C, enclosure 42 houses a terminator 18 at an end of cable 14, as well as a power tap 38 and associated power supply 36. A motor overload relay module 44 is positioned within enclosure 42 and includes circuitry for monitoring the line current associated with a three-phase motor (not shown in FIG. 1C). Motor overload relay module 44 further is configured to provide a signal to interrupt the line current if a fault condition, such as a phase loss or ground fault, is detected. Motor overload relay module 44 is coupled to cable 14 via a modular connector 16. Cable 14 exits enclosure 42 and is routed to a variety of sensor and actuator positions where it is coupled to actuators 46 and sensors or input devices 48 via drop or device cables 50. Moreover, cable 14 may include splice hardware 52, flat cable connection hardware 54 and so forth. At a far end of cable 14, a second terminator 18 is positioned. While any suitable electrical cable may be utilized for device cables 50, in the preferred embodiment of network 10, device cables 50 include a variety of configurations suitable for various applications, including prefabricated multi-pin drop cables, multi-lead cables which are connected to connectors 16 via terminal blocks or similar arrangements.

Figure 2:
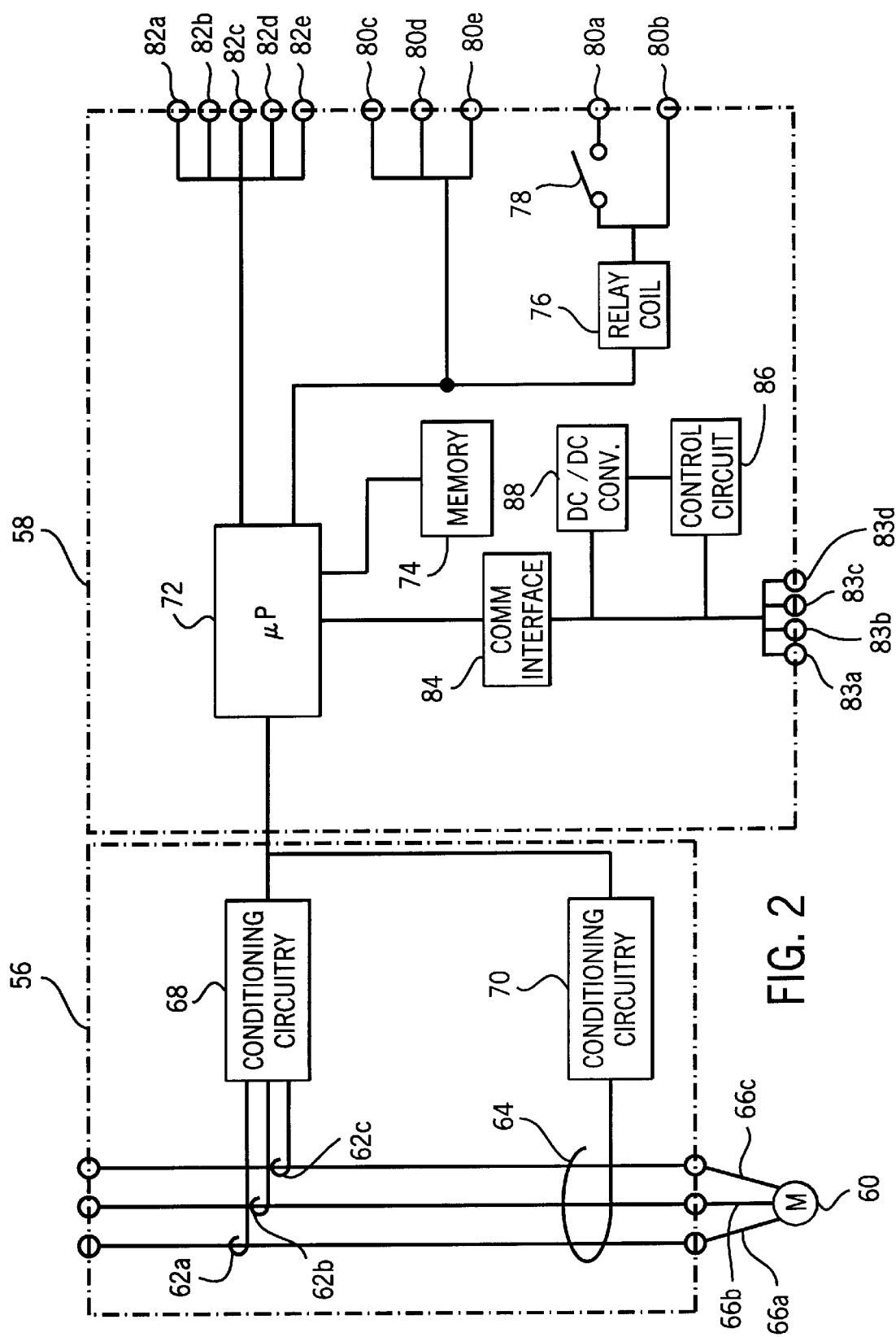
FIG. 2 is a diagrammatical illustration of typical circuitry included in the motor overload relay illustrated in FIG. 1C, the circuitry including a current control circuit in accordance with the invention.

Turning now to FIG. 2, a diagrammatic illustration of various functional components and circuitry included in motor overload relay module 44 is illustrated. Motor overload relay 44 includes a sensing module 56 and a control module 58. Sensing module 56 includes sensors 62a, 62b, 62c, and 64, which are arranged to monitor the line current on three-phase power lines 66a, 66b, and 66c associated with a motor 60. Sensors 62a–c and 64 may be Hall effect sensors having a core through which three-phase power lines 66a–c are passed. In alternative embodiments of the invention, sensors 62a–c and 64 can be any type of sensor appropriate for measuring or comparing current, such as a current transformer. Sensor 62a–c and 64 produce output signals which are representative of the current in three-phase power lines 66a–c. These output signals are provided to conditioning circuitry 68 and 70 which appropriately condition (e.g. filter, amplify, convert, etc.) the signals as appropriate for compatibility with various control circuitry included in control module 58.

Control module 58 includes a micro-controller 72 which is configured to execute a variety of control functions in accordance with a program stored in a memory 74. For example, micro-controller 72 can be configured to determine the existence of a fault condition based on the signals received from conditioning circuitry 68 and 70. The program stored in memory 74 may include algorithms which micro-controller 72 executes to calculate a current imbalance condition which is indicative of a ground fault. Additionally, the program stored in memory 74 may include an algorithm which micro-controller 72 executes to calculate the average current flowing in three-phase conductors 66a–c and the percentage current imbalance between each of the three-phase conductors. If the percentage current imbalance exceeds a threshold level, then a loss of phase condition may be indicated. If either a ground fault condition or a loss of phase condition is detected, micro-controller 72 will provide an output signal sufficient to energize a coil 76 of a trip relay (e.g., a sub-miniature relay). Energization of coil 76 causes opening of a relay switch 78 coupled to output terminals 80a and 80b of control module 58. Opening of switch 78 results in interruption of operation of motor 60. For example, output terminal 80a and 80b may be appropriately connected such that relay switch 78 is in series with a power supply and the energization coil of a three-phase contactor (not shown). When relay switch 78 opens in response to indication of a fault condition, the contactor coil will be de-energized. Accordingly, the three-phase conductors 66a–c will be placed in an open condition, resulting in interruption of operation of motor 60.

In addition to providing an output signal to activate relay coil 76 in response to signals received from sensing module 56, micro-controller 72 may be configured to activate coil 76 in response to signals received from networked sources via cable 14 and network terminals 83 or from non-networked sources via input terminals 82a–e. Still further, micro-controller 72 may be configured to perform other functions that result in other types of output signals being provided at output terminals 80c–e of control module 58 or transmitted to the network via return terminals 83, such as status indications, data signals representative of monitored parameters, etc. Such output signals may be based on information received from sensing module 56 or from other inputs provided to micro-controller 72 from external sources via inputs 82a–e of control module 58.

As mentioned above, control module 58 is configured to exchange data with other network devices 12 via media cable 14. Control module 58 connects to media cable 14 via network terminals 83a–d of modular connector 16 (connector 16 is not shown in FIG. 2). Data exchange between control module 58 and other network devices 12 passes through a communication interface 84 of control module 58. Communication interface 84 formats the data in an appropriate manner for exchange between networked devices 12 and micro-controller 72.

Control module 58 receives electrical power from the media cable 14 via network terminals 83a and 83d of modular connector 16. The electrical power passes through a control circuit 86, the output of which is connected to a DC/DC converter 88, which converts the electrical power in a manner that is compatible with the circuitry in control module 58 (e.g. $24V_{DC}$ on the network power conductors is converted to $5V_{DC}$). Control circuit 86 controls the transient currents that may result from connecting motor overload relay module 44 to media cable 14, energizing relay coil 76, etc. The manner in which circuit 86 controls transient currents will be discussed below.

Figure 3:
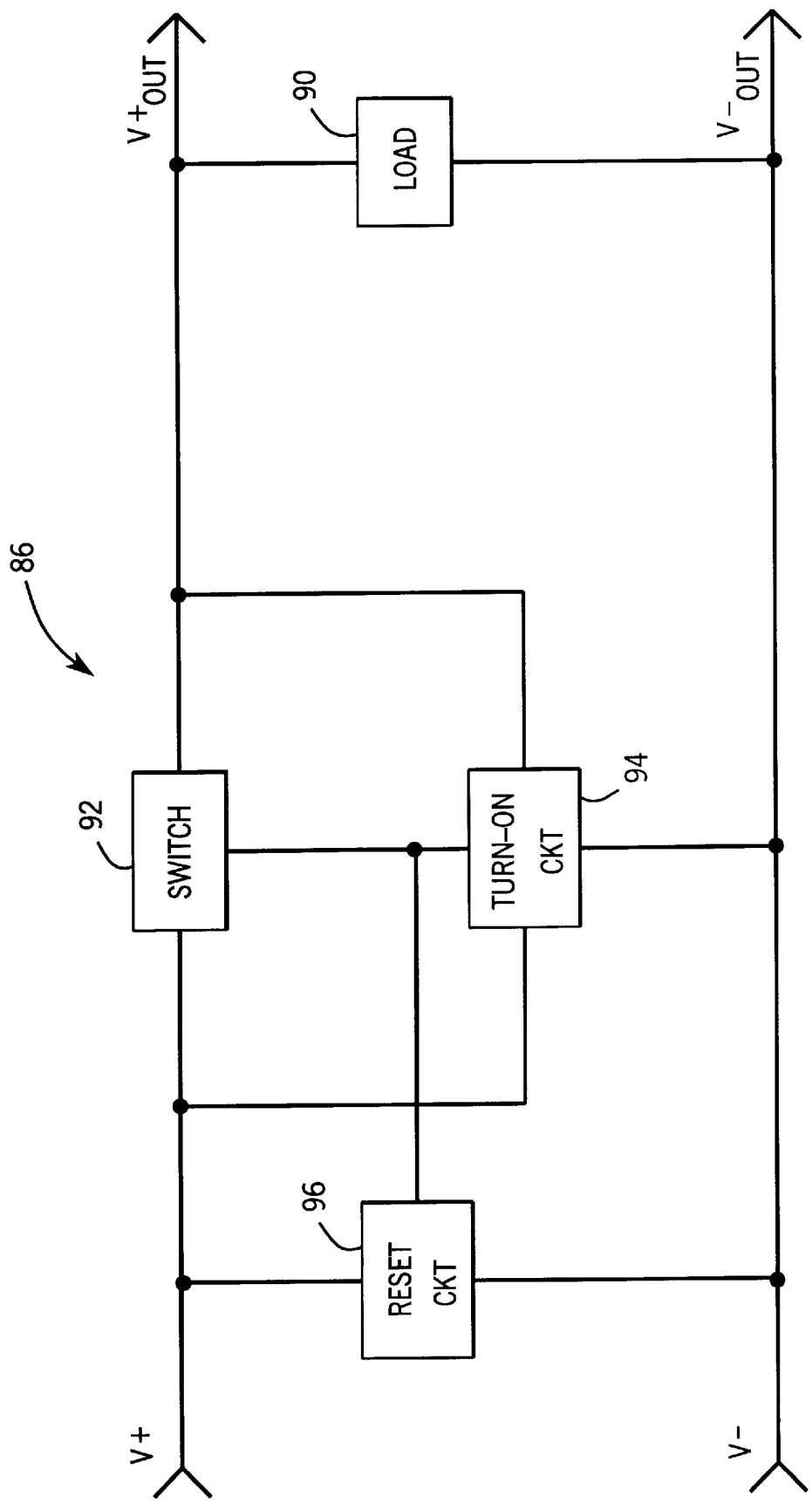
FIG. 3 is a diagrammatical illustration of some of the functional components of the current control circuit illustrated in FIG. 2.

Turning now to FIG. 3, a diagrammatic illustration of the various components of control circuit 86 are illustrated. Although control circuit 86 has just been described as being a circuit that is included in a motor overload relay module 44, such as the motor overload relay 44 illustrated in FIG. 2, it should be understood that control circuit 86 may be disposed at a variety of locations within the network 10, such as in a networked device 12 other than a motor overload relay module, or even within a modular connector 16. Further, it should be understood that control circuit 86 need not be limited to applications in which circuit 86 is disposed within or associated with a networked device. For example, control circuit 86 may be included in a stand-alone power supply.

As illustrated in FIG. 3, control circuit 86 includes inputs $V^+$ and $V^-$ which are coupled to a source of DC electrical power, such as the power conductors 32 and 34 and power supply circuit 36 in network 10. A load 90 is coupled to the output of control circuit 86. As discussed above, load 90 may be any device which presents a transient load to the $V^+$ and $V^-$ inputs which provide electrical power to control circuit 86. For example, the DC/DC converter 88 in motor overload relay module 44 represents such a load.

Control circuit 86 includes a switch 92 coupled between the $V^+$ input and the $V^+_{OUT}$ output of circuit 86, a turn-on circuit 94, and a reset circuit 96. In the preferred embodiment of the invention, switch 92 is a voltage-controlled switch and, more preferably, is a voltage-controlled current source. Turn-on circuit 94 controls the turn-on characteristics of switch 92 such that the inrush current through switch 92, that occurs as a result of connection of load 90 to the $V^+_{OUT}$ and $V^-_{OUT}$ output of circuit 86, flows in a controlled manner. Thus, turn-on circuit 94 preferably is configured to limit the rate of rise of the inrush current, as well as the peak amplitude of the inrush current during the period in which switch 92 is transitioning from a non-conductive state to a state in which load 90 is fully connected to the output of circuit 86. If switch 92 is a voltage-controlled switch, then turn-on circuit 94 controls the turn-on characteristics of switch 92 by applying a turn-on voltage to switch 92 in a controlled manner.

Reset circuit 96 is configured to quickly reset switch 92 to a non-conductive state when the input voltage between the $V^+$ and $V^-$ power conductors drops below a threshold level. If the level of voltage provided by the power conductors drops below a threshold level, then the available power that can be delivered to load 90 will be significantly reduced, in effect disconnecting load 90 from the power conductors. If, however, switch 92 is not quickly reset to a non-conductive state during a voltage drop-out condition, then when the voltage level on the power conductors returns to a level sufficient to deliver adequate power to load 90, an uncontrolled inrush of current will result because switch 92 is still in a conductive state.

Accordingly, reset circuit 96 is configured to reset switch 92 within a reset period having a shorter time duration than the time in which a voltage dropout on the $V^+$ and $V^-$ power conductors would typically recover (e.g., 5 milliseconds). Such voltage dropouts on the power conductors can be caused by switch bounce, connection or disconnection of other devices from the power conductors, energization of actuators which are powered from the power conductors, etc.

Figure 4:
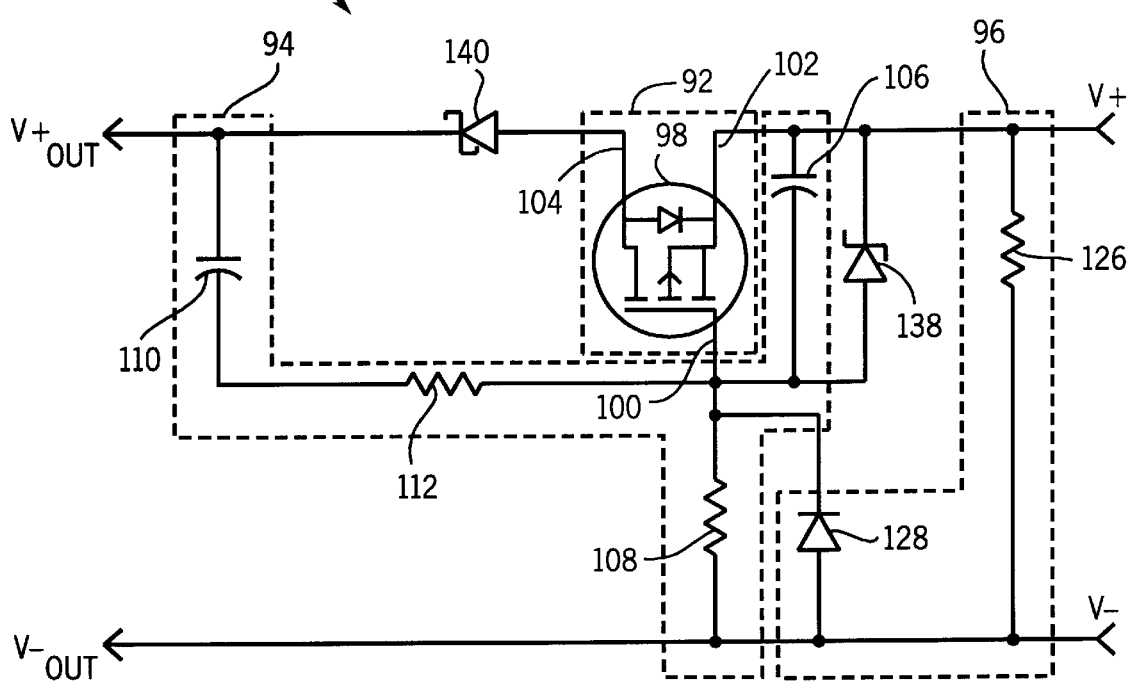
FIG. 4 is a schematic diagram illustrating the circuit components of the current control circuit of FIG. 3 in accordance with a preferred embodiment of the invention.

A circuit schematic of preferred components which accomplish the functions described in FIG. 3 are illustrated in FIG. 4. With reference to FIG. 4, switch 92 is a p-channel MOSFET 98 having a gate 100, a source 102, and a drain 104. Source 102 is electrically connected to the $V^+$ input to circuit 86 and drain 104 is electrically connected to the output $V^+_{out}$ of circuit 86. Turn-on circuit 94 includes a charging capacitance 106 coupled between gate 100 and source 102 of p-channel MOSFET 98. Turn-on circuit 94 further includes a charging impedance 108 electrically connected between gate 100 and the $V^-$ input. Turn-on circuit 94 is arranged to work in conjunction with the inherent turn-on characteristics of a MOSFET.

In particular, a MOSFET is a voltage-controlled current source having a transconductance which is controlled by the magnitude of voltage applied between the gate and the source of the MOSFET. The MOSFET has a non-conductive state in which the flow of current between the drain and the source is substantially prevented. This nonconductive state can be maintained so long as the voltage that is applied between the gate and the source of the MOSFET is below a threshold level $V_T$. As is well known to one skilled in the art, the value of $V_T$ is dependent on the magnitude of the current sourced by the MOSFET, as well as the ambient temperature, and, thus, is not a fixed value. Once the gate-to-source voltage reaches the threshold level $V_T$, the current conducted through the MOSFET begins to increase. As current is conducted through the MOSFET, the internal gate-to-source capacitance of the MOSFET transitions to an apparent connection that is in parallel with the MOSFET's internal gate-to-drain capacitance. Once the internal gate-to-source capacitance appears wholly connected to parallel with the internal gate-to-drain capacitance, the gate-to-source voltage can increase to a level at which a static current through the MOSFET can be maintained.

The turn-on circuit 94 illustrated in FIG. 4 takes advantage of the inherent turn-on characteristics of the p-channel MOSFET. Turn-on circuit 94 includes an external charging gate-to-source capacitance 106 connected between gate 100 and source 102, and a charging impedance 108 connected between gate 100 and the $V^-$ power conductor. Turn-on circuit 94 also includes an external gate-to-drain capacitance 110 connected in series with an impedance 112. Capacitance 110 and impedance 112 are connected between drain 104 and gate 100 of MOSFET 98.

Figure 5:
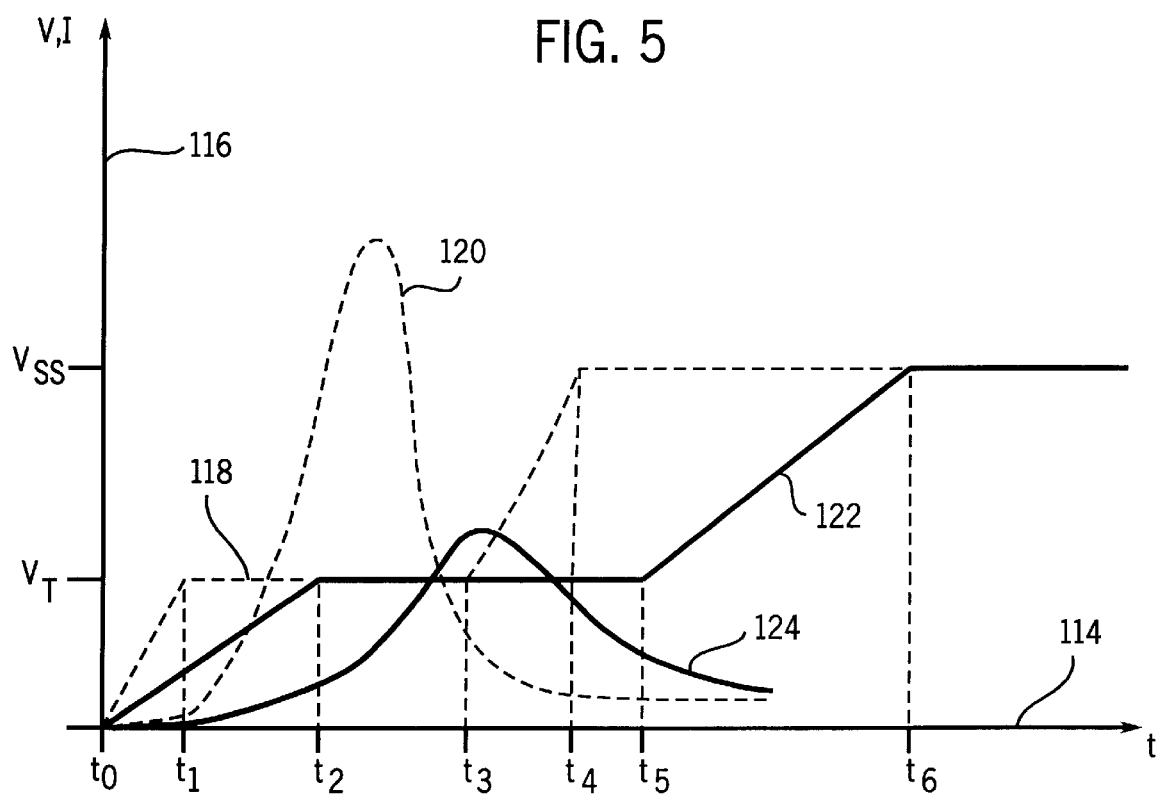
FIG. 5 is a graphical representation of voltage and current waveforms, comparing the turn-on voltage and inrush current obtained using the current control circuit illustrated in FIG. 4 with the turn-on voltage and inrush current that results if a current control circuit is not used.

Referring now to FIG. 5, the operation of turn-on circuit 94 shall be described with reference to the illustrated voltage and current waveforms. FIG. 5 is a graph having a horizontal axis 114 representative of time and a vertical axis 116 representative of the magnitude of voltage and current. A waveform 118 and a waveform 120, which are illustrated in dashed lines, are representative of the gate-to-source voltage across MOSFET 98 and the source-to-drain current through MOSFET 98, respectively, when a turn-on circuit 94 is not used. Waveforms 122 and 124, which are illustrated by solid lines, are representative of the gate-to-source voltage applied to MOSFET 98 by turn-on circuit 94 and the resultant source-to-drain current through MOSFET 98 due to the controlled application of a gate-to-source voltage by turn-on circuit 94.

With reference to voltage waveform 118, the gate-to-source voltage of the MOSFET increases from a zero level at time $t_0$ to a magnitude $V_T$ at a time $t_1$. The rate of increase of the gate-to-source voltage from time $t_0$ to $t_1$ is determined by the time required to charge the MOSFET's internal gate-to-source capacitance. From time $t_1$ to time $t_3$, the gate-to-source voltage remains substantially constant as the MOSFET's internal gate-to-drain capacitance is transitioning to a connection that is in parallel with the MOSFET's internal gate-to-source capacitance. At time $t_3$, the MOSFET's gate-to-source capacitance is fully connected in parallel with the gate-to-drain capacitance, and the gate-to-source voltage then continues to increase to a level denoted on the graph as $V_{SS}$ at time $t_4$, at which point static source-to-drain current through MOSFET 98 can be maintained. From time $t_0$ to time $t_1$ during which the gate-to-source voltage has not reached level $V_T$, current flow through MOSFET 98 is substantially restricted as represented by current waveform 120. Once the gate-to-source voltage has reached level $V_T$ at time $t_1$, current through MOSFET 98 can increase rapidly. By time $t_3$, MOSFET 98 is fully conductive. Accordingly, during the time period extending between $t_1$, and $t_3$, transient currents due to connections of loads to the output of current control circuit 86 can reach high magnitudes, as shown by current waveform 120.

Turn-on circuit 94 controls current transients by controlling the turn-on characteristics of MOSFET 98. Since external gate-to-source charging capacitance 106 is larger (e.g., 0.1 uF) than the MOSFET's internal gate-to-source capacitance, the rate of rise of the gate-to-source voltage applied to MOSFET 98 is determined by the time required to charge external charging capacitance 106 through charging impedance 108 (e.g., 196 kilohms). Because the MOSFET is a voltage-controlled current source, decrease in the rate of change in voltage across the internal gate-to-source capacitance in turn causes a decrease in theirate of change in current flowing through the MOSFET. Accordingly, from time $t_0$ to time $t_2$, at which point the gate-to-source voltage reaches the MOSFET's threshold voltage $V_T$, the rate of change in current through MOSFET 98 is substantially restricted.

During the time period extending between $t_2$ and $t_5$, the external gate-to-drain capacitance 110 is transitioning to a connection in parallel with the external gate-to-source capacitance 106 and, thus, controls the magnitude of current that may flow through MOSFET 98. The gate-to-source voltage remains substantially at $V_T$ for a longer time than the time associated with voltage waveform 118, because the magnitude of external gate to capacitance 110 increases the time needed to fully transition the gate-todrain capacitance to a connection that is in parallel with the gate-to-source capacitance. The capacitive value of capacitor 110 (e.g. 0.01 uF) is selected to limit the peak current amplitude during the period between $t_2$ and $t_5$ to a desired limited level. Impedance 112, which is connected in series with capacitance 110, damps any oscillations that may occur while capacitor 110 is charging. The magnitude of impedance 112 (e.g., 46.4 ohms) is much smaller than the magnitude of charging impedance 108.

While a long turn-on time is desirable to control the inrush current through MOSFET 98, a relatively short reset period, during which the MOSFET transitions from the static conductive state to a substantially non-conductive state is preferable. A short reset period is particularly desirable in situations in which the voltage delivered by the power conductors V⁺ and V⁻ has several repetitive rising and falling edges, such as may be the case due to switch bounce, etc. In such a situation, the first rising edge of the voltage on the power V⁺ and V⁻ conductors would be recognized by current control circuit 86 and the resultant inrush current could be controlled. However, successive rising edges could produce an uncontrolled current inrush through the MOSFET if the MOSFET is not reset during a relatively short time period, because the MOSFET will still be in a conductive state and, thus, appear transparent to the V⁺ and V⁻ inputs of control circuit 86.

To prevent uncontrolled transient current as a result of repetitive rising edges, reset circuit 96 resets MOSFET 98 to a non-conductive state in a relatively short period of time (e.g., 5 milliseconds) whenever the line voltage on the V⁺ and V⁻ power conductors drops out. Reset circuit 96 includes an external gate-to-source discharge impedance 126 (e.g., 10 kilohms) which is connected between input power conductors V⁺ and V⁻ to provide a discharge path for gate-to-source capacitance 106. Reset circuit 96 further includes a diode 128 connected in parallel with charging impedance 108. When the voltage on the input power conductors drops to a sufficiently low level, diode 128 is forward biased and, thus, effectively shorts across charging impedance 108. Capacitor 106 then discharges through discharge impedance 126 and diode 128. When the voltage across capacitor 106 falls below the threshold voltage $V_T$ of MOSFET 98, MOSFET 98 is placed in the non-conductive state. Impedance 126 is sized such that the discharge or reset time (e.g., 5 milliseconds) typically is shorter than the time required to charge the charging capacitance 106 from zero to threshold voltage $V_T$. However, in other embodiments, the reset time may be substantially the same as the charging time or may be much shorter than the charge time.

Figure 6:
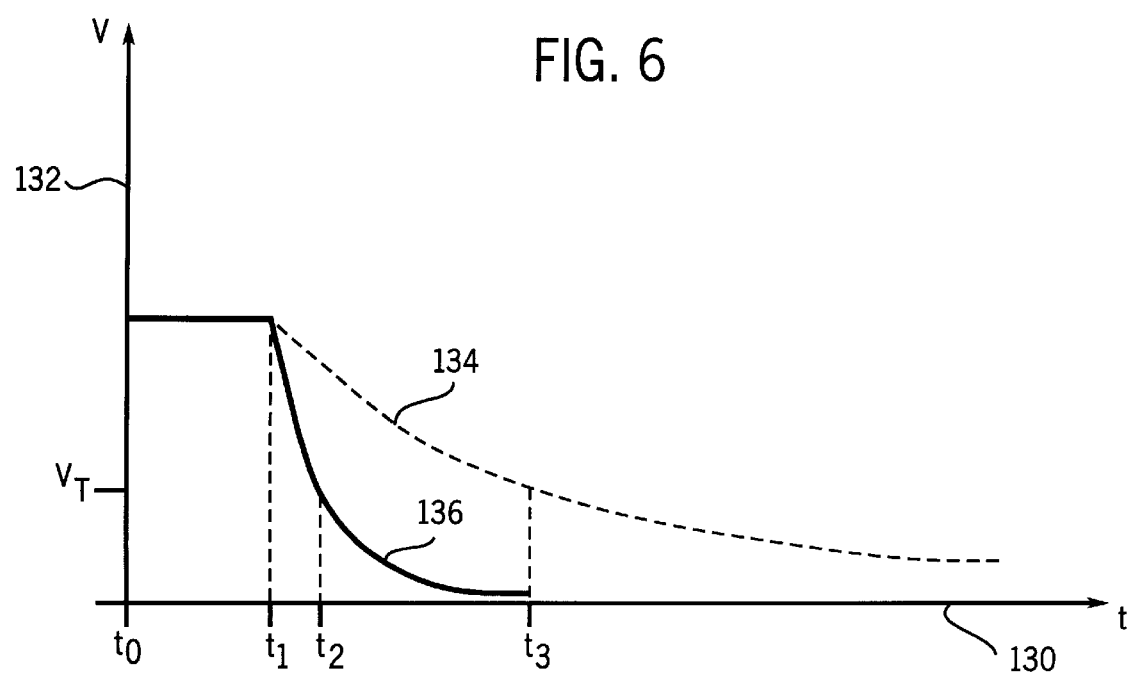
FIG. 6 is a representation of voltage waveforms used to reset a current control circuit to a non-conducting state, comparing the reset voltage obtained using the current control circuit illustrated in FIG. 4 with the reset voltage that would result if the reset circuitry of FIG. 4 were not used.

The reset of MOSFET 98 is illustrated in the graph in FIG. 6. The graph includes a horizontal axis 130 representative of time and a vertical axis 132 representative of the magnitude of the gate-to-source voltage across MOSFET 98. Waveform 134, which is illustrated by dashed lines, is representative of the gate-to-source voltage across MOSFET 98 if reset circuit 96 is not used. Waveform 136, illustrated by a solid line, is representative of the gate-to-source voltage across MOSFET 98 which results from the use of reset circuit 96. From time $t_0$ to $t_1$, the input voltage applied to circuit 86 by the power conductors is at a relatively constant level and the gate-to-source voltage applied to MOSFET 98 remains substantially constant. At time $t_1$, a drop-off of the line voltage between V⁺ and V⁻ occurs, which is sufficient to cause discharge of external gate-to-source charging capacitance 106. If reset circuit 96 is not employed, MOSFET 98 will not be reset to a non-conductive state until a time $t_3$. This long reset time (e.g., 50 milliseconds) results because external gate-to-source capacitor 106 would have to discharge through a relatively high impedance path provided by charging impedance 108. If, however, reset circuit 96 is employed, MOSFET 98 may be reset to a non-conductive state in a much shorter time period (e.g., 5 milliseconds). That is, because diode 128 shorts across charging impedance 108, capacitor 106 may be discharged much more quickly, resulting in reset of MOSFET 98 at a time $t_2$ as opposed to a time $t_3$.

Returning to FIG. 4, current control circuit 86 may also include a zener diode 138 connected from the gate-to-source of MOSFET 98 to prevent application of a gateto-source voltage having a magnitude that could potentially damage MOSFET 98. Circuit 86 additionally may include a Schottky diode 140 connected in series with the drain of MOSFET 98 and the $V^+_{OUT}$ output of circuit 86. Schottky diode 140 prevents current leakage back into circuit 86.

It should be understood that FIG. 4 represents a preferred implementation of a current control circuit 86, and the invention should not be construed as limited to the specific components or the particular interconnections between components illustrated in FIG. 4. As would be readily apparent to one skilled in the art, current control circuit 86 could be implemented using other types of components, components which are interconnected in a different manner, or components having different values or magnitudes than those disclosed.

While the invention may be susceptible to various modifications and alternative forms, specific embodiments have been shown and described herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A current transient control circuit, comprising:
   a input;
   an output;
   a voltage-controlled current source electrically connected between the input and the output, the voltage-controlled current source having a first state in which a current flow is substantially prevented and a second state in which a current flow is generated;
   a turn-on circuit electrically connected to the voltage-controlled current source to apply a turn-on voltage to place the voltage-controlled current source in the second state, the turn-on circuit being configured to limit a rate of rise of the turn-on voltage and a peak amplitude of the current flow generated while the voltage-controlled current source is in the second state; and
   a reset circuit electrically connected to the voltage-controlled current source to reset the voltage-controlled current source to the first state at a reset rate.

2. The current transient control circuit as recited in claim 1, further comprising:
   a load electrically connected to the output; and
   first and second power conductors to transmit electrical power to the load, the first power conductor being electrically connected to the input,
   wherein the first and second power conductors are disposed within a network media cable, the network media cable electrically connecting a plurality of nodes in a network, and the load is disposed at one of the plurality of nodes.

3. The current transient control circuit as recited in claim 2, wherein the load is a DC—DC converter.

4. The current transient control circuit as recited in claim 2, wherein the reset circuit resets the voltage-controlled current source when the magnitude of voltage between the first and second power conductors falls below a threshold value.

5. The current transient control circuit as recited in claim 1, wherein the voltage-controlled current source is a FET having a gate, a source, and a drain.

6. The current transient control circuit as recited in claim 5, wherein the turn-on voltage is applied between the gate and the source of the FET and the turn-on circuit includes a charging capacitance and a charging impedance configured to limit the rate of rise of the turn-on voltage.

7. The current transient control circuit as recited in claim 6, wherein the turn-on circuit further includes current-limiting capacitance electrically connected to the gate and the drain of the FET to limit the peak amplitude of the current flow generated while the FET is in the second state.

8. The current transient control circuit as recited in claim 6, wherein the reset circuit includes a diode connected in parallel with the charging impedance to provide a path for a discharge current to discharge the charging impedance to reset the FET to the first state.

9. In a network including a plurality of nodes connected to a media cable, the media cable including first and second power conductors for providing electrical power to the nodes, first and second data conductors for transmitting data between the nodes, and an insulative cover extending over the power conductors and the data conductors, at least one of the nodes including a transient control circuit comprising:

a solid-state switch coupled between the first power conductor and a load disposed at the at least one node, the solid-state switch having a conductive state in which a current flow through the solid-state switch can be maintained static, and a nonconductive state in which the current flow through the solid-state switch is substantially prevented;

a turn-on circuit coupled to the solid-state switch to control the current flow through the solid-state switch during a transition period during which the solid-state switch transitions from the non-conductive state to the conductive state, the turn-on circuit configured to limit a rate of increase and a peak amplitude of the current flow during the transition period; and a reset circuit coupled to the solid-state switch to reset the solid-state switch from the conductive state to the nonconductive state when the magnitude of voltage between the first and second power conductors falls below a threshold value.

10. The transient control circuit as recited in claim 9, wherein the reset circuit resets the solid-state switch within a reset period, the reset period being shorter than the transition period.

11. The transient control circuit as recited in claim 9, wherein the solid-state switch is a voltage-controlled current source, and the turn-on circuit applies a turn-on voltage to the voltage-controlled current source to limit the rate of increase of the current flow during the transition period.

12. The transient control circuit as recited in claim 11, wherein the turn-on circuit includes a turn-on capacitance and a charging impedance configured to limit the rate of increase and the peak amplitude of the current flow during the transition period.

13. The transient control circuit as recited in claim 12, wherein the voltage-controlled current source is a FET having a gate, a drain, and a source, and the turn-on capacitance includes a first capacitor electrically connected between the gate and the source to limit the rate of increase of the current flow during the transition period and a second capacitor electrically connected between the gate and the drain to limit the peak amplitude of the current flow during the transition period.

14. The transient control circuit as recited in claim 13, wherein the reset circuit includes a diode electrically connected in parallel with the charging impedance to provide a path for a current to discharge the first capacitor during the reset period.

15. In a network including a plurality of nodes connected to a media cable, the media cable including first and second power conductors for providing electrical power to the nodes, first and second data conductors for transmitting data between the nodes, and an insulative cover extending over the power conductors and the data conductors, at least one of the nodes including a transient control circuit comprising:

a voltage-controlled switch electrically connected between the first power conductor and the load, the voltage-controlled switch having a non-conductive state in which a current flow through the voltage-controlled switch is substantially prevented, and a conductive state in which the current flow is enabled, the conductive state including a static mode of operation in which the current flow can be maintained static and a transition mode of operation during which the voltage-controlled switch transitions from the non-conductive state to the static mode of operation; and a turn-on circuit coupled to the voltage-controlled switch to control the transition mode of operation, the turn-on circuit limiting a rate of increase and a peak amplitude of the current flow during the transition mode of operation.

16. The transient control circuit as recited in claim 15, wherein the turn-on circuit includes a turn-on capacitance and a charging impedance configured to limit the rate of increase and the peak amplitude of the current flow during the transition mode of operation.

17. The transient control circuit as recited in claim 16, wherein the voltage-controlled switch is a FET having a gate, a drain, and a source.

18. The transient control circuit as recited in claim 17, wherein the turn-on capacitance includes a charging capacitor electrically connected between the gate and the source to limit the rate of increase of the current flow and a current limiting capacitor electrically connected between the gate and the drain to limit the peak amplitude of the current flow.

19. The transient control circuit as recited in claim 15, further comprising a reset circuit electrically connected to the voltage-controlled switch to reset the voltage-controlled switch from the conductive state to the non-conductive state when the magnitude of voltage between the first and second power conductors falls below a threshold value.

20. The transient control circuit as recited in claim 19, wherein the reset circuit resets the voltage-controlled switch during a reset period having a duration shorter than a duration of the transition mode of operation of the voltage-controlled switch.

21. In a network including a plurality of nodes connected to a media cable, the media cable including first and second power conductors for providing electrical power to a load disposed at one of the nodes, first and second data conductors for transmitting data between the nodes, and an insulative cover extending over the power conductors and the data conductors, a method of controlling transients on the power conductors, comprising:

electrically coupling a voltage-controlled switch between the first power conductor and the load, the voltage-controlled switch having a static mode of operation, in which a current flow between the power conductor and the load can be maintained static, and a non-conductive state in which mode of operation in which the current flow is substantially prevented;

applying a voltage to the voltage-controlled switch to cause the voltage-controlled switch to transition from the non-conductive state to the static mode of operation during a transition period;

controlling the applied voltage to limit a rise time of the current flow during at least a portion of the transition period;

limiting a peak amplitude of the current flow during the transition period; and resetting the voltage-controlled switch from the static mode of operation to the non-conductive state.

22. The method as recited in claim 21, wherein the predetermined condition occurs when the magnitude of voltage between the first and second power conductors falls below a threshold value.

23. The method as recited in claim 21, wherein the voltage-controlled switch is a FET having a gate, a source and a drain.

24. The method as recited in claim 23, wherein controlling the applied voltage includes charging a first capacitor through a charging impedance, the first capacitor being electrically connected between the gate and the source of the FET.

25. The method as recited in claim 24, wherein limiting the peak amplitude includes charging a second capacitor, the second capacitor being electrically connected between the gate and the drain of the FET.

26. The method as recited in claim 25, wherein resetting the voltage-controlled switch includes providing a discharge path to substantially discharge the second capacitor within a reset period, the reset period being shorter than the transition period.

* * * * *